(12) United States Patent
Xu

(10) Patent No.: US 7,543,075 B2
(45) Date of Patent: Jun. 2, 2009

(54) METHOD OF ESTABLISHING A BI-DIRECTIONAL LABEL SWITCHED PATH IN AN OPTICAL NETWORK

(75) Inventor: Yongliang Xu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 616 days.

(21) Appl. No.: 10/745,683

(22) Filed: Dec. 29, 2003

(65) Prior Publication Data

US 2004/0151159 A1    Aug. 5, 2004

(30) Foreign Application Priority Data

Dec. 26, 2002    (CN)    .............................. 02 1 60332

(51) Int. Cl.
*G06F 15/173* (2006.01)
(52) U.S. Cl. .................... 709/238; 709/240; 709/242; 709/244
(58) Field of Classification Search ................. 709/238
See application file for complete search history.

(56) References Cited

U.S. PATENT DOCUMENTS 7,359,377 B1 * 4/2008 Kompella et al. ........... 370/389

2002/0054405 A1 * 5/2002 Guo et al. .................... 359/118
2002/0172150 A1 * 11/2002 Kano .......................... 370/216
2002/0191247 A1 * 12/2002 Lu et al. ...................... 359/124

FOREIGN PATENT DOCUMENTS

WO    WO02/17542    * 2/2002

OTHER PUBLICATIONS

'RSVP-TE: Extensions to RSVP for LSP Tunnels' Axduche et al., IETF Standard, Internet Engineering Task Force, Dec. 2001, pp. 1-61.

* cited by examiner

*Primary Examiner*—William C Vaughn, Jr.
*Assistant Examiner*—Maceeh Anwari
(74) *Attorney, Agent, or Firm*—Ladas & Parry LLP

(57) ABSTRACT

A method of establishing a bi-directional Label Switched Path (LSP) includes an establishing request and available upstream and downstream label sets are sent from a first node to a terminal node of the LSP node-by-node. If the available upstream or downstream label set obtained by the terminal node or other nodes is null, the LSP can't be established; if the establishing request is sent to the terminal node and the received available upstream and downstream label sets are not null, the terminal node chooses an upstream label and an downstream label. An establishing response and the upstream and downstream labels are sent from the terminal node to the foregoing nodes node-by-node, and each of other nodes except the first node chooses an upstream label and a downstream label to an upstream node according to the upstream and downstream labels provided by the downstream node.

15 Claims, 3 Drawing Sheets

METHOD OF ESTABLISHING A BI-DIRECTIONAL LABEL SWITCHED PATH IN AN OPTICAL NETWORK

This application claims the priority of Chinese Patent Document No. 02 1 60332.4, filed Dec. 26, 2002, the disclosure of which is expressly incorporated by reference herein.

FIELD OF THE INVENTION

The present invention relates to a method of establishing bi-directional label switched path (LSP) in an optical network.

BACKGROUND OF THE INVENTION

In today's optical networks, e.g., Synchronous Digital Hierarchy/Synchronous Optical Network (SDH/SONET), a GMPLS signaling is used to establish a bi-directional LSP, which comprises a forward path and a reverse path, wherein the forward path is established on "downstream on-demand", i.e., the downstream node is allocated and labeled only on request of the upstream node; the reverse path is established on "downstream initiative", i.e., the downstream node provides the label to the upstream mode initiatively. The bi-directional LSP comprises two LSPs with the same entry and exit nodes but opposite direction, the LSP from entry to exit node corresponds to the downstream label; while the LSP from exit to entry node corresponds to the upstream label. When establishing the bi-directional LSP, usually the upstream node designates upstream label for the reverse path of the bi-directional LSP, and the upstream label is designed to establish reverse connection. For instance, in the case of bi-directional multiplexing segment protection ring shown in FIG. 1, there are node A, B, C, D, . . . on the ring; suppose a bi-directional LSP is to be established between node A and D, and the available link label resource is shown in Table 1 (the links in Table 1 refer to bi-directional links between nodes), the available label set includes available upstream label set and available downstream label set.

TABLE 1

| Link | Available Upstream Label Set | Available Downstream Label Set |
|------|------------------------------|--------------------------------|
| A-B  | 1, 3, 4                      | 1, 2, 3, 4                     |
| B-C  | 2, 3, 4                      | 2, 3, 4                        |
| C-D  | 2, 4                         | 3, 4                           |

Due to the fact that the time slot (i.e., label) occupation on the bi-directional multiplexing segment protection ring should be consistent, the process of establishing a bi-directional LSP from node A to D according to traditional method is as follows (shown in FIG. 2):

First, the first node A initializes a request to establish a bi-directional LSP by sending a signaling message carrying upstream label 1 designated from the upstream label set (may be designated randomly or orderly) and available downstream label set {1, 2, 3, 4} to node B in step 1; node B receives the bi-directional LSP establishing request from node A, verifies the availability of upstream label 1, and then establishes a signaling message of requesting for establishing a bi-directional LSP (the signaling message carries the upstream label 1 and available downstream label set {2, 3, 4} of its link segment) and forwards the message to node C in step 2; node C receives the signaling message from node B and finds that the upstream label 1 is unavailable (i.e., mismatch with available upstream label set from node B to Node C), and determines the LSP can't be established, in step 3, node C sends a rejection message to node B, which in turn sends the message to the first node A in step 4, and returns the label set {2, 3, 4} acceptable by the current link segment to the first node A. The first node A receives the rejection message, chooses upstream label 3 from available upstream label set from the first node A to node B according to the returned acceptable label set {2, 3, 4}, and then initiates a signaling message of requesting for establishing a bi-directional LSP (the signaling message carries upstream label 3 and available downstream label set {1, 2, 3, 4}) to node B in step 5; node B receives the signaling message and finds upstream label 3 is acceptable, and then forwards the signaling message carrying upstream label 3 and available downstream label set {2, 3, 4} for its current link segment to node C in step 6; node C receives the signaling message and finds the upstream label 3 is available for itself, and then forwards the upstream label 3 and available downstream label set {3, 4} for current link segment to node D through establishing a signaling message of request for establishing a bi-directional LSP; node D receives the message forwarded from node C and finds the upstream tag 3 is unavailable (i.e., mismatch with the available label set from node C to node D), and then returns a rejection message and an acceptable label set {2, 4} for current link segment to node C in step 8, through node C to node B in step 9, and through node B to the first node A in step 10. Node A receives the rejection message, chooses upstream label 4 from the available upstream label set from node A to node B according to the returned acceptable label set {2, 4}, and initiates a bi-directional LSP establishing request in step 11, 12, and 13, node B and C receive the bi-directional LSP establishing request in step 11, 12 and 13 in sequence and find the upstream label 4 is acceptable, and then node C forwards the request to node D so that the reverse LSP of the bi-directional LSP is established. At the same time, node D chooses the downstream label 3 according to the available downstream label set {3, 4} and returns a successfully-established message and downstream label 3 to node C in step 14, through node C to node B in step 15, and through node B to node A in step 16; the first node A confirms the message, thus the bi-directional LSP is established.

Seen from above example, retrials of upstream label exists because node A doesn't take into account the restriction of acceptable labels for subsequent nodes while designating the upstream label; in the extreme case, the number of retrials is equal to the number of nodes involved minus 1. The existence of label retrials has a strong impact on the establishing time of GMPLS-based bi-directional LSP in SDH/SONET networks, and it even more delays service restoration at fault recovery. Therefore, the success ratio of traditional method is very low in the case that the available labels on the link where the labeled switching path passes are limited.

SUMMARY OF THE INVENTION

The object of the present invention is to provide a method of establishing a bi-directional LSP in an optical network effectively; with the method, a bi-directional LSP can be established in a single signaling cycle, thus the establishing time is reduced.

To attain the object, the method of establishing a bi-directional Label Switched Path (LSP) in an optical network according to the present invention comprises:

a bi-directional LSP establishing request as well as an available upstream label set and an available downstream label set are sent from a first node to a terminal node of the bi-directional LSP in a node-by-node manner;

if the available upstream label set or the available downstream label set obtained by the terminal node or other nodes before the terminal node is null, the bi-directional LSP can't be established; if the bi-directional LSP establishing request is sent to the terminal node and both the received available upstream label set and available downstream label set are not null, the terminal node chooses an acceptable upstream label and an acceptable downstream label from the received available upstream label set and available downstream label set;

the bi-directional LSP establishing response as well as the upstream label and the downstream label are sent from the terminal node to foregoing nodes of the bi-directional LSP in a node-by-node manner, and each of other nodes except the first node chooses an upstream label and a downstream label to an upstream node till the first node according to the upstream label and the downstream label provided by the downstream node.

The available upstream label set and available downstream label set are intersections of the available upstream label set and the available downstream label set output from a current node and the available upstream label set and the available downstream label set on a relevant link segment between the current node and a downstream node, the available upstream label set and the available downstream label set output from the current node being obtained with a cross restriction of the current node and the available upstream label set and available downstream label set provided by the upstream node.

For the first node, the method of obtaining the available upstream label set and the available downstream label set comprises: the available upstream label set and available downstream label set on the link segment from the first node to its immediate subsequent node serves as the available upstream label set and available downstream label set;

For each node except the first node and the terminal node on the bi-directional LSP link, the method of obtaining the available upstream label set and the available downstream label set comprises: first, the available upstream label set and the available downstream label set received are taken as inputs for the current node, next, an available upstream label set including all possible upstream labels and an available downstream label set including all possible downstream labels output by the current node is obtained with the cross restriction of the current node, then the intersections of the available upstream label set and the available downstream label set output and the available upstream label set and the available downstream label set on the link segment from the current node to its immediate subsequent node are taken as the obtained available upstream label set and available downstream label set.

GMPLS signaling is used to establish the bi-directional LSP.

Because that the present invention employs a bi-directional LSP establishing request signaling in optical network, i.e., the signaling process from entry node to exit node carries the available upstream label sets that indicates the upstream label sets are available for reverse paths, each of subsequent node on the bi-directional LSP can allocate upstream labels correctly according to the available upstream label set of its upstream node; because that the allocation of upstream labels during the bi-directional LSP establishing process is postponed to the time when the signaling returns from exit node to entry node, compared with traditional method, the label processing method in the present invention can adapt to the features of SDH/SONET network better and avoid the fact that the downstream node may not accept the upstream label designated by the upstream node for establishing the reverse path when label selection is restricted. As a result, a bi-directional LSP can be established in a single signaling cycle, which accelerates the bi-directional LSP establishing process.

DETAILED DESCRIPTION OF THE EMBODIMENT

The object of the present invention is mainly to solve the issue of low success ratio of establishing bi-directional LSP in optical networks (e.g., SDH/SONET network).

The present invention will be described in detail with reference to the attached drawings.

Figure 2:
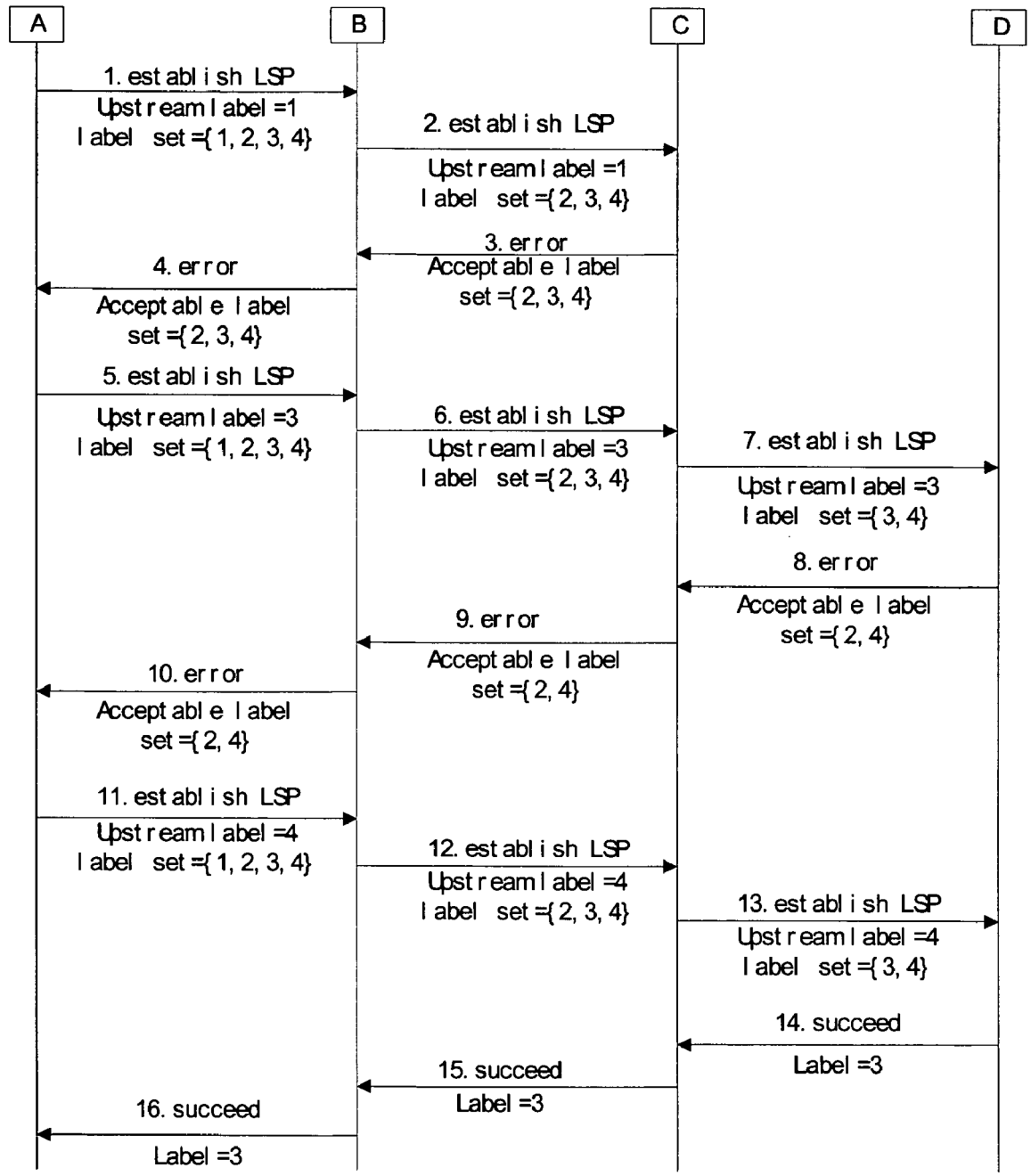
FIG. 2 is a flow chart of bi-directional LSP establishing process on a bi-directional multiplexing segment protection ring according to traditional method.

In the embodiment of traditional method in FIG. 2, the reason for rejection of upstream labels created at nodes where the bi-directional LSP passes mainly is that only the availability of upstream label set on the link segment between the current node and its immediate subsequent node is taken into consideration when the upstream label is selected during the establishment of the bi-directional LSP rather than available upstream label sets between the current node and indirect subsequent nodes, thus the labels selected from the preceding available label set may not fall into the subsequent available label set, so that the upstream label chosen by the upstream node is not available at the downstream node. For instance, in the embodiment for establishing a bi-directional LSP in FIG. 2, the upstream node A chooses the upstream label 1; however, when the upstream label 1 is forwarded along with the bi-directional LSP establishing request to the downstream node C via node B in step 1 and 2, it can't be used at the downstream node C because the available upstream label set from node B to node C is {2, 3, 4}; thus a rejection message has to be returned to node A and the "acceptable label set" {2, 3, 4} from the immediate upstream node to node C has to be sent to node A so as to instruct node A that next upstream label conforms to the acceptable label set {2, 3, 4} of the current link segment. However, because the reported available label set only reflects the available upstream label set on the link segment from the current node (i.e., node C) to its immediate foregoing node (i.e., node B) instead of the available labels from the current node (i.e., node C) to its subsequent node (i.e., node D). Therefore, it can't solve the problem of restriction of upstream label at downstream nodes.

Based on the analysis, it is obvious that the primary cause for restriction of upstream label selected by the upstream node at the downstream node is that there is contradiction between the label selection by the upstream node and the label demand of the downstream node. Because the positive direction of the bi-directional LSP path is from the first upstream node to the downstream terminal node (e.g., from node A to node D), and terminal node D is the last node where the bi-directional LSP path is determined whether it is established successfully, if the selection of upstream label by the upstream node and the judgment of upstream label availability by the downstream node are handed over to the downstream node and finally performed by the terminal node of the path, a bi-directional LSP may be established in a single bi-directional LSP establishing signaling cycle. That is to say, during establishment of the bi-directional LSP, the first node doesn't designate the upstream label, instead, it sends the available upstream label set to the terminal node along with the bi-directional LSP establishing signaling; the terminal node responds to the bi-directional LSP establishing signaling, allocates the upstream label and the downstream label, and establishes a bi-directional cross connection. In this way, the problem of repeated retrials caused by the first node designating the upstream label at own discretion without knowledge of available labels on the entire path may be avoided, and a bi-directional LSP can be established in a single GMPLS signaling cycle.

The present invention is implemented as follows: started from the first node of the bi-directional LSP, the bi-directional LSP establishing request is sent in a node-by-node manner and the available upstream label set and available downstream label set for the current node is obtained till the terminal node is met according to the information resource (i.e., available upstream label set and available downstream label set) of the current link segment, the information resource is provided by the upstream node; the current link segment refers to the link between the node sending or forwarding the bi-directional LSP establishing request and its immediate subsequent node. During above process, for the first node, the method of obtaining available upstream label set and available downstream label set comprises: the available upstream label set and available downstream label set on the link segment from the first node to its immediate subsequent node are taken as the available upstream label set and available downstream label set to be obtained, i.e., the available upstream label set and available downstream label set on the current link segment are used directly; for any node except the first node and the terminal node on the bi-directional LSP, the method of obtaining available upstream label set and available downstream label set comprises: first, the available downstream label set received is taken as the input for the current node, a set including all possible available downstream labels output by the current node is obtained with the cross restriction of the current node, the available upstream label set received is taken as the output for the current node, a set including all possible available upstream labels input by the current node is obtained with the cross restriction of the current node; then the intersection of the label set output and the available label set on the link segment from the current node to its immediate subsequent node is taken as the obtained available upstream label set and available downstream label set. In this way, each of downstream nodes on the bi-directional LSP can choose available upstream and downstream labels to reverse and forward paths from the available upstream and downstream label sets obtained; however, the premise is: the available upstream label set or downstream label set obtained is not null. Therefore, if the available upstream or downstream label set obtained at any node before the terminal node is null, the establishment of the bi-directional LSP will definitely fail, and retry is necessary; if the bi-directional LSP establishing request is sent to the terminal node and the obtained available label sets are not null, the terminal node may choose available upstream label and downstream label from the available upstream and downstream label sets obtained; then a bi-directional LSP establishing response and upstream and downstream labels are sent from the terminal node to the foregoing nodes in a node-by-node manner, i.e., a bi-directional cross link request is established. During the process, the terminal node chooses upstream and downstream label from the available upstream label set and available downstream label set, and besides, other nodes also chooses upstream label and downstream label for the upstream node according to the upstream and downstream label provided by the downstream node till the first node.

Figure 1:
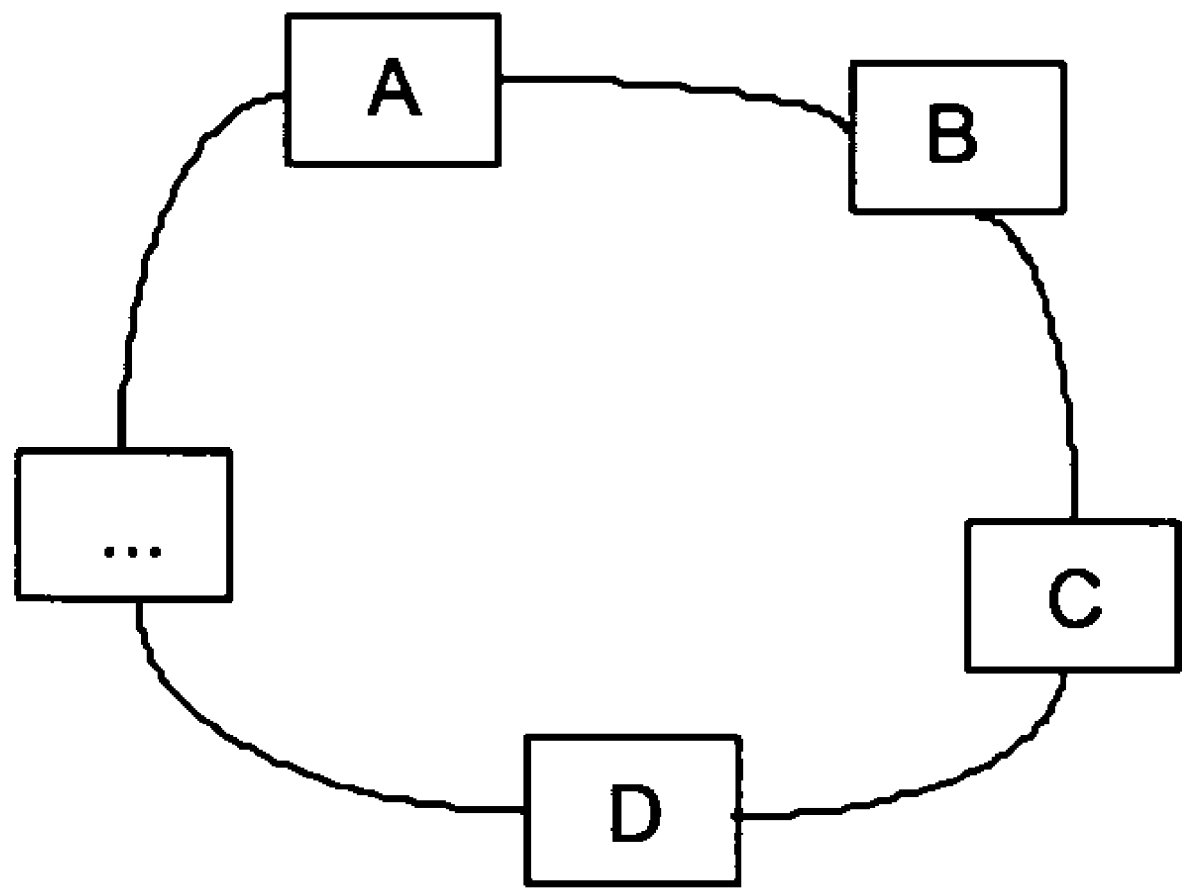
FIG. 1 shows the structure of bi-directional multiplexing segment protection ring.
Figure 3:
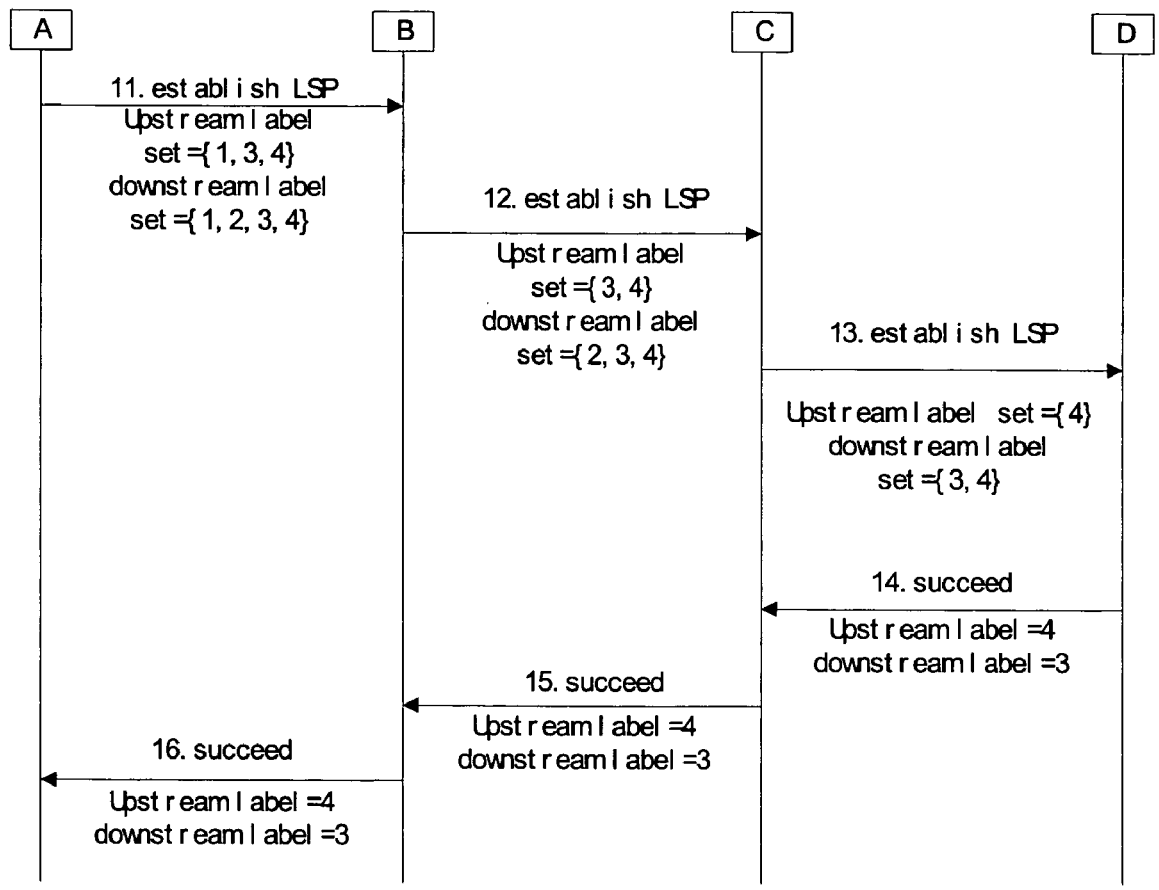
FIG. 3 is a flow chart of bi-directional LSP establishing process on a bi-directional multiplexing segment protection ring according to the method of the present invention.

FIG. 3 shows the detailed embodiment of the present invention. The embodiment of establishing a bi-directional LSP in FIG. 3 is based on the MSP protection ring shown in FIG. 1 and available label sets on relevant links shown in Table 1, and it is implemented with GMPLS signaling.

First, the first node A sends a request message to node B to establish a bi-directional LSP from node A to node D in step 11, and it also transfers the available upstream label set {1, 3, 4} and available downstream label set {1, 2, 3, 4} on link segment "AB" along with the request to node B; node B receives and processes the request message, and obtain an available upstream label set {1, 3, 4} and available downstream label set {1, 2, 3, 4} according to the available upstream label set {1, 3, 4} and available downstream label set {1, 2, 3, 4} and the cross restriction of the current node (i.e., input and output time slots should be consistent), then "AND" operation is performed between the available upstream and downstream label sets obtained and the available upstream label set {2, 3, 4} and available downstream label set {2, 3, 4} on link segment "BC" to obtain the available upstream label set {3, 4} and available downstream label set {2, 3, 4}, next, node B forwards the bi-directional LSP establishing request message along with the available upstream label set {1, 3, 4} and the available downstream label set {1, 2, 3, 4} to node C in step 12; similarly, node C receives and processes the bi-directional LSP establishing request message, and forwards the bi-directional LSP establishing request message and send the available upstream label set {4} and available downstream label set {3, 4} obtained according to the received available upstream label set {3, 4} and available downstream label set {2, 3, 4} and the available upstream label set {2, 4} and available downstream label set {3, 4} on link segment "CD" to node D in step 13; node D also receives and processes the bi-directional LSP establishing request message and obtains upstream label 4 and downstream label 3 available for the reverse path of LSP according to the available upstream label set (4) and available downstream label set {3, 4} received from node C and local available label information. After the upstream and downstream labels are obtained, node D feeds back a bi-directional LSP establishing response (i.e., success message) to node C in step 14 to establish a bi-directional cross link, at the same time, it returns the upstream label 4 and downstream label 3 obtained to node C; because that the requirement of label occupation on the bi-directional multiplexing segment protection ring is consistent, node C feeds back the upstream label 4 and downstream label 3 for the bi-directional LSP as well as a response for establishing a bi-directional cross link to node B in step 15, and then node B feeds back the same information to node A in step 16; when node A receives the response and the upstream and downstream labels, the bi-directional LSP is established successfully.

In the embodiment of the present invention, the signaling exchanging situation during establishment of the reverse path is described in detail; however, the establishment of the forward path will still be performed in the "downstream on-demand" manner. Therefore, with the solution of the present invention, the downstream label and upstream label for forward path and reverse path of the bi-directional LSP may be identical or different.

The invention claimed is:

1. A method of establishing a bi-directional Label Switched Path (LSP) in an optical network, comprising:
 a bi-directional LSP establishing request, an available upstream label subset and an available downstream label subset are sent from a first node to a terminal node of the bi-directional LSP in a node-by-node manner, wherein each node has available upstream and downstream label sets, each particular node except the first node receives portions of the available upstream and downstream label sets of the first node from an adjacent upstream node and then AND-matches the received portions with the available upstream and downstream label sets of that particular node to form AND-matched available upstream and downstream label subsets of that particular node, and each particular node except the first and terminal nodes sends corresponding AND-matched available upstream and downstream label subsets of that particular node to an adjacent downstream node, if either of the AND-matched available upstream or downstream label subsets obtained by the terminal node or obtained by other nodes before the terminal node is null, the bi-directional LSP can't be established, and if the bi-directional LSP establishing request is sent to the terminal node and if both the AND-matched available upstream and downstream label subsets are not null, the terminal node chooses an acceptable upstream label having a single upstream pathway inclusive between the first node and the terminal node and an acceptable downstream label having a single downstream pathway inclusive between the terminal node and the first node from the received AND-matched available upstream and downstream label subsets; and a bi-directional LSP establishing response, and the chosen upstream and downstream labels are sent from the terminal node to foregoing nodes of the bi-directional LSP in a node-by-node manner, and each foregoing node, except the first node, chooses upstream and downstream labels to a respective adjacent upstream node till the first node in accordance to the AND-matched available upstream and downstream label subset provided by the terminal node.

2. The method of establishing a bi-directional LSP according to claim 1, wherein the portions of the available upstream and downstream label subsets of the first node sent to the terminal node 4 comprise AND-matched intersections of the available upstream and downstream label sets of a current node with portions of the available upstream and downstream label sets of a downstream node, the resultant AND-matched available upstream and downstream label subsets output from the current node are thereby a cross restriction of the current node with the downstream node.

3. The method of establishing a bi-directional LSP according to claim 2, wherein for the first node, the method of obtaining the portions of the available upstream and downstream label subsets of the first node to the terminal node comprises: AND-matching together the available upstream and downstream label sets on the link segment from the first node to the available upstream and downstream label sets of the node immediately adjacent upstream to the first node;

for each node except the first node, a second node and the terminal node on the bi-directional LSP link, the method of obtaining the portions of the available upstream and downstream label subsets from the first node to the terminal node comprises: first receiving AND-matched available upstream and downstream label subsets from the downstream node as inputs for the current node, next, the available upstream label set of the current node including all possible upstream labels of the current node and the available downstream label set of the current node including all possible downstream labels output by the current node are obtained and then AND-matching together with the received AND-matched available upstream and downstream label subsets from the downstream node which is also known as cross restriction of the current node, the intersections of the available upstream and downstream label sets of the current node with the received AND-matched available upstream and downstream label subsets from the downstream node are then subsequently output as AND-matched available upstream and downstream label subsets of the current node on the link segment from the current node to its immediate subsequent upstream node.

4. The method of establishing a bi-directional LSP according to claim 1, wherein the available upstream and downstream label sets of the first node are sent on the link segment from the first node to its immediate subsequent upstream node;

for each node except the first node and the terminal node on the bi-directional LSP link, the method of obtaining the portions of the available upstream and downstream label subsets of the first node to the terminal node comprises: first, receiving portions of the available upstream and downstream label sets of the downstream node at the current node, next, an available upstream label set of the current node including all possible upstream labels and an available downstream label set of the current node including all possible downstream labels output by the current node are then AND-matching together with the received portions of the available upstream and downstream label sets of the downstream node to output the AND-matched available upstream and downstream label subsets of the current node on the link segment from the current node to its immediate subsequent upstream node.

5. The method of establishing a bi-directional LSP according to claim 4, wherein GMPLS signaling is used to establish the bi-directional LSP.

6. A method of establishing a bi-directional LSP according to claim 3, wherein GMPLS signaling is used to establish the bi-directional LSP.

7. A method of establishing a bi-directional Label Switched Path (LSP) in an optical network, comprising:

sending a bi-directional LSP establishing request, an available upstream label set and an available downstream label set from a first node to a terminal node of the bi-directional LSP in a node-by-node manner wherein each node has available upstream and downstream label sets, each particular node except the first node receives portions of the available upstream and downstream label sets of the first node from an adjacent upstream node and then AND-matches the received portions with the available upstream and downstream label sets of that particular node to form AND-matched available upstream and downstream label subsets of that particular node, and each particular node except the first and terminal nodes sends corresponding AND-matched available upstream and downstream label subsets of that particular node to an adjacent downstream node;

not establishing the bi-directional LSP if either of the AND-matched available upstream label subset or the AND-matched available downstream label subset obtained by the terminal node or obtained by any other nodes before the terminal node is null;

the terminal node choosing an acceptable upstream label having a single upstream pathway inclusive between the first node and the terminal node and an acceptable downstream label having a single downstream pathway inclusive between the terminal node and the first node from the received AND-matched available upstream and downstream label subsets if the bi-directional LSP establishing request is sent to the terminal node and if both the received AND-matched available upstream and downstream label subsets are not null; and sending a bi-directional LSP establishing response, the upstream label and the downstream label chosen by the terminal node to the other nodes of the bi-directional LSP in a node-by-node manner, wherein although the terminal node chooses the upstream label and the downstream label from the received AND-matched available upstream and downstream label subsets, one or more nodes except the first node chooses an upstream label and a downstream label to an upstream node in accordance to the AND-matched available upstream and downstream label subset provided by terminal node until the first node is reached.

8. The method of establishing a bi-directional LSP according to claim 7, wherein the AND-matched available upstream and downstream label subsets output from the current node are intersections of the available upstream and downstream label sets of the current node and the AND-matched available upstream and downstream label subsets of the downstream node on the link segment between the current node and the downstream node, wherein the AND-matched available upstream and downstream label subset output from the current node are cross restrictions of the current node and the downstream node which are made available from the current node to the upstream node adjacent to the current node.

9. The method of establishing a bi-directional LSP according to claim 8, wherein the available upstream and downstream label sets of the first node are sent on the link segment to its immediate upstream subsequent node; and wherein for each node except the first node, a second node and the terminal node on the bi-directional LSP link, the step of obtaining the portions of the available upstream and downstream label subsets from the first node to the terminal node comprises: first, receiving the AND-matched available upstream downstream label subsets from an adjacent downstream node as inputs into the current node, next, obtaining an available upstream label set including all possible upstream labels of the current node and an available downstream label set including all possible downstream labels of the current node in a cross restriction of this current node with the adjacent downstream node to AND-match the intersections together of the available upstream and downstream label sets of the current node with the received AND-matched available upstream and downstream label subsets form the adjacent downstream node to output as a AND-matched available upstream and downstream label subsets of the current node on the link segment from this current node to its immediate upstream subsequent node.

10. The method of establishing a bi-directional LSP according to claim 7, wherein the first node outputs the available upstream and downstream label sets to its immediate upstream subsequent node; and wherein for each node except the first node and the terminal node on the bi-directional LSP link, the step of obtaining the portions of the available upstream and downstream label subsets of the first node to the terminal node comprises: first, receiving AND-matched available upstream and downstream label subsets from an adjacent downstream node as inputs, next, obtaining an available upstream label set including all possible upstream labels of the current node and an available downstream label set including all possible downstream labels of the current node, then AND-matching together the available upstream and downstream label sets of the current node with the received AND-matched available upstream and downstream label subset from the adjacent downstream node to output AND-matched available upstream and downstream label subsets of the current node on the link segment to an immediate upstream subsequent node.

11. The method of establishing a bi-directional LSP according to claim 10, further comprising using GMPLS signaling to establish the bi-directional LSP.

12. A method of establishing a bi-directional LSP according to claim 9, further comprising using GMPLS signaling to establish the bi-directional LSP.

13. The method of establishing a bi-directional LSP according to claim 1, wherein the single upstream pathway is the same as the single downstream pathway.

14. The method of establishing a bi-directional LSP according to claim 7, wherein the single upstream pathway is the same as the single downstream pathway.

15. A method of establishing a bi-directional Label Switched Path (LSP) in an optical network, comprising:

a bi-directional LSP establishing request, an available upstream label subset and an available downstream label subset are sent from a first node to a terminal node of the bi-directional LSP in a node-by-node manner, wherein each node has available upstream and downstream label sets, each particular node except the first node receives portions of the available upstream and downstream label sets of the first node from an adjacent upstream node and then AND-matches the received portions with the available upstream and downstream label sets of that particular node to form AND-matched available upstream and downstream label subsets of that particular node, each particular node except the first and terminal nodes sends corresponding AND-matched available upstream and downstream label subsets of that particular node to an adjacent downstream node, if either the AND-matched available upstream or downstream label subsets received by the terminal node obtained by the terminal node or obtained by other nodes before the terminal node is null, the bi-directional LSP can't be established, and if the bi-directional LSP establishing request is sent to the terminal node and if both the AND-matched available upstream and downstream label subsets are not null, the terminal node chooses an acceptable upstream label having a single upstream pathway inclusive between the first node and the terminal node and an acceptable downstream label having a single downstream pathway inclusive between the terminal node and the first node from the received AND-matched available upstream and downstream label subsets wherein the single upstream pathway is the same as the single downstream pathway; and a bi-directional LSP establishing response, and the chosen upstream and downstream labels are sent from the terminal node to foregoing nodes of the bi-directional LSP in a node-by-node manner, and each foregoing node, except the first node, chooses upstream and downstream labels to a respective adjacent upstream node till the first node in accordance to the AND-matched available upstream and downstream label subset provided by the terminal node.

* * * * *